Oct. 24, 1944.   R. ATTI   2,360,838
APPARATUS FOR ROASTING COFFEE
Filed April 5, 1941   2 Sheets-Sheet 1

INVENTOR
RAPHAEL ATTI
BY Gustav Drews
ATTORNEY

Oct. 24, 1944.  R. ATTI  2,360,838
APPARATUS FOR ROASTING COFFEE
Filed April 5, 1941  2 Sheets-Sheet 2
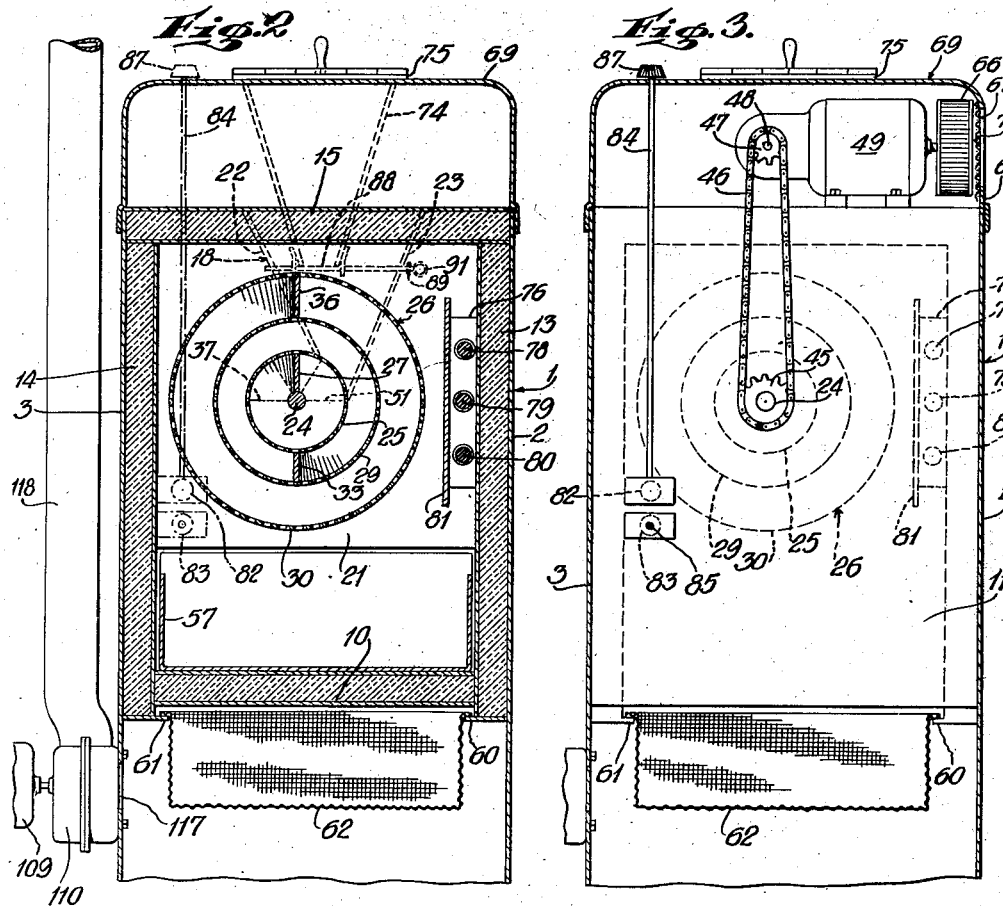
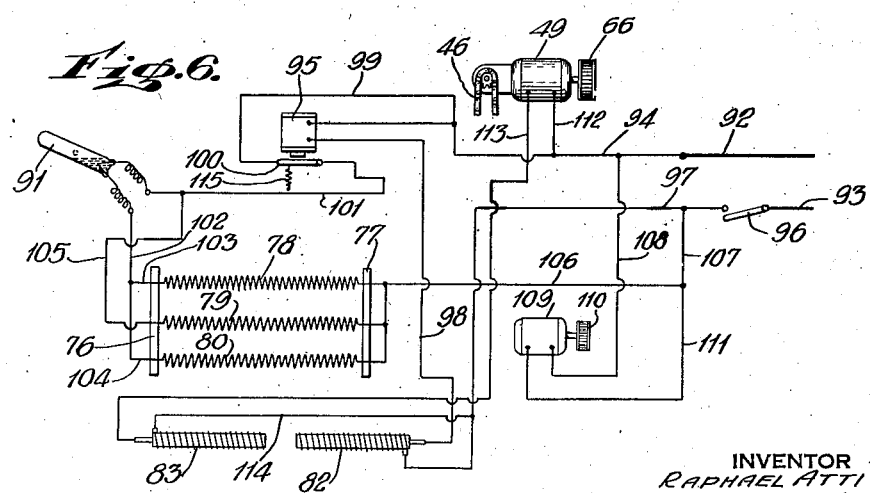
INVENTOR
RAPHAEL ATTI
BY Gustav Drews
ATTORNEY Patented Oct. 24, 1944

2,360,838

UNITED STATES PATENT OFFICE 2,360,838

APPARATUS FOR ROASTING COFFEE

Raphael Atti, Cliffside Park, N. J.

Application April 5, 1941, Serial No. 386,992

13 Claims. (Cl. 99—236)

This invention relates to an improved apparatus for roasting coffee in general and more especially to an apparatus for roasting coffee for use by retail stores whereby small quantities of coffee may be roasted as they are sold from day to day, such for instance as disclosed in my copending application for patent Serial No. 297,991, filed October 5, 1939, now Patent No. 2,301,922 of November 17, 1942.

Among the objects of the present invention, it is aimed to provide an improved apparatus for roasting coffee in which the agitation of the coffee beans is not started until a predetermined degree of heat has been produced in the roasting furnace in which the degree of heat thereafter will continue within certain heating temperatures to maintain an approximate uniform temperature throughout the roasting process, and in which the heating temperature of the heat producing units is reduced when the end portion, or a diminished amount of a predetermined supply of coffee beans starts passing through the roaster when a lower heat temperature is established to compensate for the heat loss that results when a complete predetermined supply of coffee beans is passing through the furnace.

These and other features, capabilities and advantages of the invention will appear from the sub-joined detail description of one specific embodiment thereof illustrated in the accompanying drawings in which:

Fig. 2 is a section on the line 2—2 of Fig. 1;

Fig. 3 is a section on the line 3—3 of Fig. 1;

Fig. 6 is a wiring diagram of the several control elements of the coffee roasting apparatus.

Figure 1:
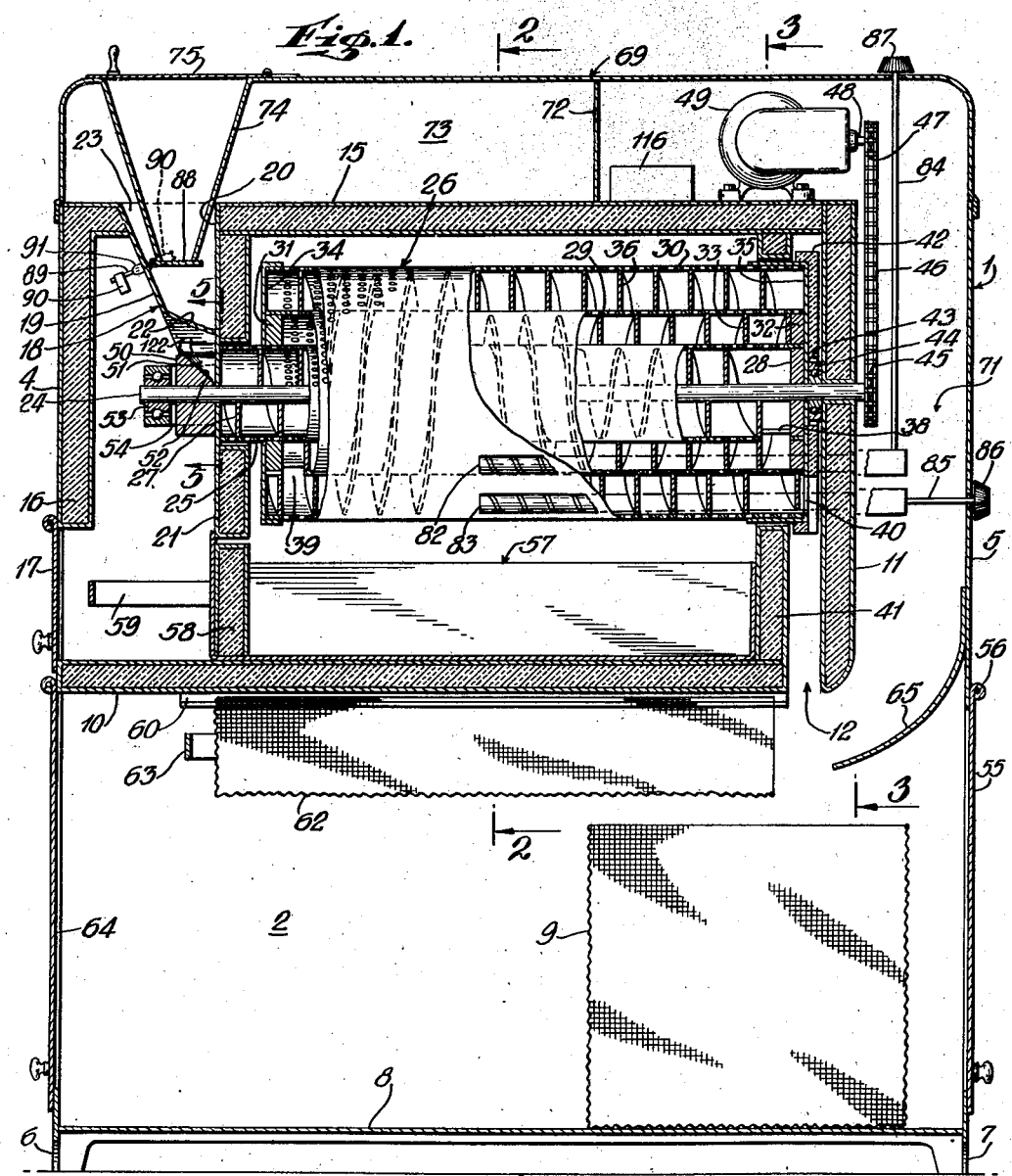
Fig. 1 is a longitudinal section of the coffee roasting apparatus.

In the embodiment shown, there is illustrated a main metal housing 1 having side walls 2 and 3 and front and end walls 4 and 5, respectively, terminating in the supporting extensions 6 and 7 resting on the floor or other suitable platform, see Fig. 1.

Secured to the walls 2, 3, 4 and 5, there is provided the lower platform 8 on which rests the coffee bean receiver or basket 9 preferably composed of some suitable foraminous material, such as a wire screen of proper mesh to house the roasted coffee bean but enable a cooling medium, such as cool air, to be blown through the walls of the basket on to the beans. Above the platform 8 and in the present instance not quite half-way up there is provided a second platform 10 which extends from the front wall 4 rearwardly to a point just forwardly of the partition 11 to form an elongated discharge passage 12 between the front face of the partition 11 and the rear end of the platform 10.

The platform 10 which is shown as provided with an inner heat insulating material extends transversely from the inner faces of the heat insulated inner wall portions 13 and 14 of the side walls 2 and 3, respectively. The partition 11 similarly is provided with an inner heat insulating material, as shown, and extends down from the rear end of the heat insulated horizontally extending partition or platform 15 which extends from the upper end of the partition 11 to the upper edges of the inner wall portions 13 and 14 and to the heat insulated inner front wall portion 16 secured to the inner face of the front outer wall 4 and extending from one to the other of the heat insulated inner wall portions 13 and 14 and down to a level spaced from the heat insulated platform 10 to form room for the door 17 hingedly connected at its upper edge to the wall 4 and lapping over onto the front edge of the platform 10.

In the horizontally extending partition 15, there is formed an opening to receive the lower funnel 18 having an inclined front wall 19, a rear substantially vertically extending wall 20 integral with the front wall member of the heat insulated partition 21 which extends to a level slightly below the lower level of the heat insulated wall portion 16. The inclined wall 19 of the funnel 18 is connected to the short inclined wall 22 and to the long inclined wall 23, see Fig. 1. The rear wall 20 is provided with an opening to receive the driven shaft 24 and the heat insulated inner wall portion 21 is provided with a circular opening concentric with the shaft opening in the wall 20 to clear the foraminous cylindrical member 25 constituting the cylindrical wall for the innermost annular chamber of the drum 26. The cylindrical member 25 is spaced from and mounted on the shaft 24 by the spiral blade 27.

At the rear end of the drum 26, the cylindrical member 25 is secured to the collar 28 secured, in turn, to the shaft 24. In the present instance, two additional foraminous members 29 and 30 are provided, the member 29 secured to the front collar 31 and to the rear collar 32 both mounted on the outer face of the cylindrical member 25, the collar 31 just rearwardly of the wall 21 and the collar 32 in alinement with the collar 28. In addition, there is provided a spiral blade 33 spacing the cylindrical member 25 from the cylindrical member 29. The cylindrical member 30, in turn, is secured to the front disc 34 secured to the front face of the collar 31. The cylindrical member 30 is also secured to the rear disc 35 secured to the rear faces of the collars 28 and 32. In addition, there is also provided a spiral blade 36 spacing the cylindrical member 29 from the cylindrical member 30. The coffee beans as they are fed to the drum 26 advance from the funnel 18 through the sector shaped opening 37, see Fig. 5, into the feed inlet of the chamber formed by the cylindrical member 25. Thereupon, due to the inclination of the spiral blade 27, the beans will be advanced always on the bottom of the member 25 toward the rear until they register with the opening 38 in the member 25 when during its rotation it is disposed at the bottom, whereupon the coffee beans will drop into the next outermost chamber formed by the cylindrical member 29 and the beans then advance forwardly by the spiral blade 33 until they register with the opening 39 in the member 29 when it is disposed at the bottom, as shown in Fig. 1, whereupon the beans will then pass into the chamber formed by the cylindrical member 30, whereupon due to the inclination of the spiral blade 36, the beans will be advanced rearwardly until they register with the opening 40 constituting the discharge outlet in the disc 35 when such opening 40 is disposed at the bottom, as shown in Fig. 1, whereupon the coffee beans will drop between the partition 11 and the partition 41 via the passage 12 to the basket 9.

The partition 41 extends from the rear end of the platform 10 up to the lower face of the platform 15 and is provided with an inner heat insulating material. This partition 41, as shown in Fig. 1, is provided with a large circular opening to receive the drum 26, that is to clear the outer periphery of the outer cylindrical member 30 of the drum 26.

Further, to heat insulate the furnace chamber formed by the platforms 10 and 15, front wall 21, rear wall 41 and side walls 13 and 14, a disc 42 of heat insulating material is secured to the rear face of the disc 35. This disc 42 has an opening registering with the opening 40 in the disc 35, as shown in Fig. 1, and is provided with an enlarged central opening 43 to receive the ball bearing housing 44 secured to the front or inner face of the partition 11. The shaft 24 at its rear end after leaving the ball bearing housing 44 passes through the partition 11 and is provided with a sprocket gear 45, see Fig. 3, which is connected by the sprocket chain 46 to the sprocket gear 47 on the shaft 48 operatively associated with the motor 49 mounted on the platform 15 adjacent the rear end of such platform 15.

Secured to the shaft 24, in front of the wall 20, there is provided the block 50 constituting a rotatable feeder which, in turn, is provided with a triangular mouth or pocket 51. This mouth 51 has two side walls formed in the block 50 intersecting one another in the line 52, see Figs. 1 and 5, and are inclined relative to one another and to a radially extending plane with the center of the shaft 24 as the axis so that whatever beans are received by the mouth 51 when the mouth registers with the lower end of the funnel 18, will be temporarily isolated and in turn, will by gravity discharge through the opening 37 in the wall 20 into the chamber formed in the cylindrical member 25. It will be seen from Fig. 5 that the mouth 51 registers with the lower end of the funnel 18 to one side of a vertical line in one-quarter cycle of its rotation and in the next quarter cycle of its rotation after passing to the other side of the vertical line will register only with the opening 37 in the wall 20. In the meantime, while the mouth 51 is moving from the funnel 18 to the opening 37, the wall 20 will serve as a partition to maintain and isolate the beans received from the funnel 18 in the pocket formed by the mouth 51 and the wall 20. This intermittent feed of isolated amounts of coffee beans is desired in order to control the feed, and thereby provide an even or uniform feed of the beans to the agitator 26 so that the coffee beans may be distributed as a thin layer throughout the agitator 26 during the roasting process.

Figures 4, 5:
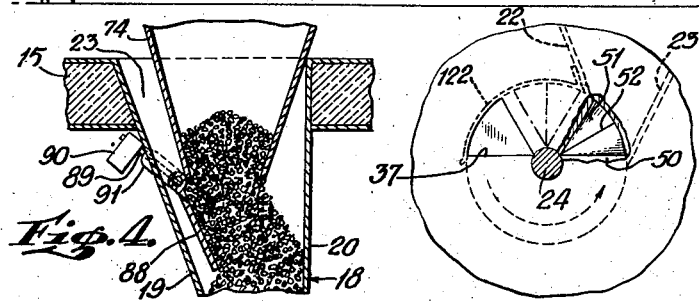
Fig. 4 is an enlarged fragmental section of the inlet or funnel combination to the coffee roasting apparatus.
Fig. 5 is a section on the line 5—5 of Fig. 1.

So that the beans in the funnel 18 will be secured against loss when passing into the mouth 51, the lower edge of the front wall 19 of the funnel 18 fits snugly around the outer periphery of the block 50, see Fig. 1, the side wall 23 will just about clear the outer face of the block 50 and the lower edge of the side wall 22, see Fig. 5, will have a spring blade 122 formed thereon to contact the outer periphery of the block 50 during its rotation.

The front end of the shaft 24 is journaled in the ball bearing housing 53 mounted in the yoke or bracket 54 extending around the block 50 from the front face of the wall 20.

In order to gain access to the basket 9, the rear wall 5 is provided with a door 55 hingedly connected at 56 to the wall 5 and overlapping the outer face of the wall 5 at its lower end, see Fig. 1.

On the platform 10 there is slidably mounted a primary chaff receiving drawer 57 preferably composed of a metal box preferably having a front heat insulated wall member 58 to the front face of which there is provided a handle 59. The heat insulated wall member 58 closes the opening formed between the lower end of the partition 21, the inner side walls 13 and 14 and the upper face of the platform 10. When it is desired to withdraw the drawer 57 it is, of course, only necessary to open the door 17 and grasp the handle 59 and slidably remove the same, discharge its contents and again return it.

Slidably mounted on the ledges 60 and 61, there is provided the secondary chaff receiving drawer 62, in the present instance composed of a foraminous material and having outwardly extending flanges along its lateral upper edges to rest on the ledges 60 and 61. This drawer 62 is also provided with a handle 63 at its front end. The rear end of the drawer 62 is open for the purposes hereinafter set forth. In order to remove the drawer 62, the door 64 will be opened. This door 64 is hingedly connected at its upper end to the front edge of the platform 10 and overlaps the front wall 4 at its lower end, see Fig. 1.

The open end of the drawer 62 is disposed just below and to one side of the discharge passage 12. Extending forwardly from the rear wall there is provided a deflector plate 65 to receive air from the fan 66 and direct the air onto the beans descending through the passage 12 into the basket 9. The air so deflected by the deflector 65 will move in a lateral direction toward the open end of the drawer 62 to direct whatever chaff or fuzzy particles may still be found on the beans into the drawer 62. The fan 66 is operatively associated with the motor 49, see Fig. 3, and adjacent the opening 67 formed in the side wall 68 of the cover 69 which opening 67 is preferably provided with a suitable screen 70, as shown. The fan 66 thus will draw cold air from the outside and direct it onto the motor 49 and downwardly through the passage 71 formed between the partition 11 and rear wall 5 on to the deflector 65.

The cover 69 is preferably provided with a partition 72 which will engage the upper face of the platform 15 and shut off the passage 71 from the chamber 73 formed to the front of the partition 72. The front portion of the cover 69 preferably also has a funnel 74 secured thereto and extending downwardly therefrom into registration with the funnel 18 when the cover 69 is properly positioned. A suitable cover 75 is secured to the cover 69 to close or shut off the entrance to the funnel 74, when desired. The lower edges of the cover 69, see Figs. 1, 2 and 3, rest on the upper edges of the outer wall members 2, 3, 4 and 5.

In the furnace chamber formed by the inner walls 13 and 14, front wall 21, rear wall 41, upper platform 15 and lower platform 16, in the present instance, see Fig. 2, supported by the bars 76 and 77 there are provided the heating coils 78, 79 and 80, the bars 76 and 77 extending inwardly from the inner face of the inner wall portion 13. Between the coils 78, 79 and 80, on the one hand, and the drum 26 on the other hand, there is interposed the shield 81 to prevent any of the radiant heat from the coils to pass directly to the beans in the drum 26.

In this furnace chamber there are also provided two thermostatic bars 82 and 83, both secured to and extending adjacent the inner face of the inner wall member 14, the upper bar 82 being operatively connected to the vertically extending control rod 84 and the lower bar 83 to the horizontally extending control rod 85, see Fig. 1. The rod 85 extends through the rear wall 5 and has provided thereon a control knob 86 to constitute one thermostat control and the rod 84 is disposed to extend through the cover 69 when the cover is in place, when control knob 87 may be secured to the outer end thereof to constitute the other thermostat control.

Hingedly connected to the side walls 22 and 23 of the lower funnel 18, there is provided an arm more specifically a trap door 88 positioned to register with and close the lower end of the upper funnel 74 when the cover 69 is in position. To maintain the trap door 88 in the horizontal position, shown in Fig. 1, there is provided a lever 89 equipped with an adjustably mounted weight 90. There is also fixed to rock with the trap door 88, the mercury switch 91. When the trap door 88 is closed, as shown in Fig. 1, the fluid mercury interrupts the current between the contacts in the mercury switch 91 and, in turn, when the trap door 88 is open or depressed, as shown in Fig. 4, the current is established.

The wiring diagram shown in Fig. 6 and its relation to the mercury switch 91, thermostat bars 82 and 83, motor 49, heating coils 78, 79 and 80 and associated parts will now be described.

The lead 92 is indicative of one line of the current supply and the lead 93 of the other line of the current supply. The lead 92 is connected by the conductor 94 to one terminal of the electromagnet 95 and the lead 93 is connected to the switch 96 which, in turn, is connected by the conductor 97 to the thermostatic control bar 82 which, in turn, is connected by the conductor 98 to the other terminal of the electromagnet 95.

The conductor 94, in turn, is connected by the conductor 99 to one terminal of the switch 100. The other terminal of the switch 100 is connected by the conductor 101 to one of the terminals of the mercury switch 91. The other terminal of the mercury switch 91 is, in turn, connected by the conductor 102 to the conductors 103 and 104 of the heating coils 78 and 80, respectively. The conductor 101, in turn, is connected by the conductor 105 to the heating coil 79.

The heating coils 78, 79 and 80 are connected by the conductor 106 to the conductor 107 which is connected to the conductor 97.

The conductor 94, furthermore, is connected by the conductor 108 to one terminal of the motor 109 having operatively connected thereto the exhaust fan 110. The other terminal of the motor 109 is connected by the conductor 111 to the conductor 107.

One terminal of the motor 49 is connected by the conductor 112 to the conductor 94 and the other terminal is connected by the conductor 113 to one terminal of the thermostatic control bar 83, and the other terminal of the control bar 83 is connected to the conductor 114 which, in turn, is connected to the conductor 97.

From the foregoing it will thus be seen that when the switch 96 is closed and a predetermined supply of coffee has been fed into the funnel 74, it will initially deflect the trap door 88 downwardly and close the mercury switch 91. Thereupon the current to the motor 109 will be immediately established to start the motor 109 and thereby the exhaust fan 110. At the same time, the electromagnet 95 will be energized to close the switch 100 and enable the current to pass through the heating coils 78, 79 and 80 constituting a plurality of heat generating means.

Thereupon when the heating coils 78, 79 and 80 raise the temperature to a predetermined degree, according to the beans used and heat insulating quality of the furnace walls, the thermostatic control bar 83 will establish the circuit for the motor 49 whereupon the rotation of the drum 26 will be started. This rotation of the drum 26 will now continue until the switch arm 96 is actuated to interrupt the current.

In the meantime, however, should the temperature exceed a predetermined degree, the thermostatic control bar 82 will interrupt the current to the electromagnet 95 to enable the spring 115 to actuate the switch 100 into open position and thereby interrupt the current to the three heating coils 78, 79 and 80. This interruption of the current to the heating coils will, however, not interrupt the current to either of the motors 49 or 109. When the temperature again drops sufficiently, the thermostatic control arm 82 will reestablish the current to the electromagnet 95 to actuate the switch arm 100 into circuit making position. After a predetermined amount of coffee beans fed to the funnel 74 has passed into the funnel 18 and cleared the trap door 88, the trap door 88 by virtue of the weight 90 on the arm 89 will swing the door 88 upward into closed position and at the same time rock the mercury switch 91 to interrupt the current to the heating coils 78 and 80, the two outer heating coils in the present instance constituting one part of the heat generating means, without affecting the current to the intermediate heating coil 79 constituting the other part of the heat generating means, whereby the initial heat will, of course, be materially reduced approximately to one-third of that when all three heating coils 78, 79 and 80 are operating. Thereupon the tail-end of the coffee beans in the predetermined quantity will pass through the drum 26 in the usual way. The current to the motors 49 and 109 and to the remaining heating coil 79 will not be interrupted until the switch 96 is finally opened.

The reason for shutting off two of the three heaitng coils during the roasting of the tail-end portion of a predetermined supply has been found necessary to prevent burning the beans in such tail-end portion. By actual practice, it has been found that as a supply of beans in the drum 26 became reduced as is the case at the tail-end of a predetermined supply, the tail-end portion or last of the supply always became slightly burned. It is believed that such burning was due to the fact that the heat in the furnace would be raised automatically when the supply of beans was reduced due to the fact that the more beans in the furnace the more heat would be absorbed by this greater supply of beans thereby reducing the temperature in the furnace as compared to a condition where a less supply of cold beans were in the furnace and therefore a less amount of heat dissipating medium present, the beans in such case acting as a heat dissipating medium.

The switch 96, electromagnet 95 and associated wiring are preferably mounted in the control box 116 supported on the platform 15 to the rear of the partition 72.

The exhaust fan 110 is preferably secured to the outer face of the wall 3 adjacent the opening 117 near the front end of the chamber in which the basket 9 and drawer 62 are located. To this exhaust fan 110 there is connected the chimney 118 extending upwardly along the outer face of the wall 3 which fan 110 and chimney 118 are provided to draw off any objectionable smoke or fumes that might be carried down to the chamber below the partition 10.

It is obvious that various changes and modifications may be made to the details of the apparatus without departing from the general spirit and scope of the invention as set forth in the appended claims.

I claim:

1. The combination of an enclosed coffee roasting furnace, a rotatable agitator in said furnace, said agitator having a supply inlet and a discharge outlet, a funnel having a trap door for receiving a predetermined supply of coffee beans, means for guiding the coffee beans from said funnel to said inlet, heat generating means in said furnace comprising two parts, thermostatic control means in said furnace responsive to the heat generated by said generating means, an electric motor operatively associated with said agitator for operating said agitator, said trap door being tiltable by such supply of beans and remaining tilted until such predetermined supply has been completely discharged clear of said trap door, a current supply, an electric switch connected to said current supply and trap door to be closed when said trap door is tilted and operatively connected to said heat generating means to cut in the current for one part of said heat generating means when said predetermined supply of coffee beans is fed into said funnel and said trap door is tilted, said control means being operatively associated with said motor and current supply to cut in the current for said motor when a predetermined temperature has been attained in said furnace by such heat generating means in turn to initiate the actuation of said agitator, and means operatively associated with said trap door to return said trap door to initial position in turn to open said switch and thereby to interrupt the current to said one part of said heat generating means without affecting the current to said motor when the predetermined supply of coffee beans clears said trap door.

2. The combination of a coffee roasting furnace, a rotatable agitator in said furnace, said agitator having a feed inlet and a discharge outlet, a funnel having a trap door for receiving a primary predetermined supply of coffee beans, a wall having an opening therein registering with said inlet, a rotatable feeder mounted to rotate with said agitator and cooperating with the opening in said wall and said funnel to enable a cyclic feed of secondary predetermined supplies of coffee beans to pass to said agitator from said primary supply, heat generating means in said furnace, thermostatic control means in said furnace, an electric motor operatively associated with said agitator for operating said agitator, said trap door being tiltable by such supply of beans and remaining tilted until such primary predetermined supply of beans has completely cleared said trap door, a current supply, and an electric switch connected to said current supply and trap door to be closed when said trap door is tilted and operatively connected to said heat generating means to cut in the current for said heat generating means when such primary supply of coffee beans is fed into said funnel, said thermostatic control means being operatively associated with said motor and current supply to cut in the current for said motor when a predetermined temperature has been attained in said furnace in turn to initiate the actuation of said agitator cyclically to feed successive predetermined secondary supplies of coffee beans to said agitator from said predetermined primary supply of beans.

3. The combination of a coffee roasting furnace, a rotatable agitator in said furnace, said agitator having a feed inlet and a discharge outlet, a funnel for receiving a primary supply of coffee beans, a wall having an opening smaller than said inlet registering with a part of said inlet to one side of the axis of rotation of said agitator, a rotatable feeder mounted to rotate with said agitator and having a pocket one end of which corresponds in size to the opening in said wall registering with said opening to one side of the axis of rotation of said feeder, said pocket being positioned cyclically to receive secondary supplies of coffee from said funnel and cyclically registering with the opening in said wall and therefore with said inlet in turn to enable a cyclic feed of successive secondary supplies of coffee beans to said agitator from said primary supply of coffee beans, heat generating means in said furnace, thermostatic control means in said furnace, an electric motor operatively associated with said agitator for operating said agitator, a trap door in said funnel actuated by the coffee beans passing through said funnel, a current supply, an electric switch operatively connected to said trap door, current supply and heat generating means to cut in the current for said heat generating means when said primary supply of coffee beans is being fed into said funnel and actuates said trap door, said thermostatic control means being operatively associated with said motor and current supply to cut in the current for said motor when a predetermined temperature has been attained in turn to initiate the actuation of said agitator and feeder cyclically to feed successive secondary supplies of coffee beans to said agitator from said primary supply, and a second thermostatic control means in said furnace connected to said heat generating means and current supply to interrupt the current to said heat generating means when a predetermined maximum temperature is reached and again to cut in the current when a predetermined minimum temperature is reached without affecting the current to said motor in order to maintain a substantially uniform temperature in said furnace.

4. The combination of a coffee roasting furnace, a rotatable agitator in said furnace, said agitator having a feed inlet and a discharge outlet, a funnel for receiving a primary supply of coffee beans, a wall having an opening smaller than said inlet and registering with a part of said inlet to one side of the axis of rotation of said agitator, a rotatable feeder mounted to rotate with said agitator and having a pocket one end of which corresponds in size to the opening in said wall registering with said opening to one side of the axis of rotation of said feeder, said pocket being positioned cyclically to receive secondary supplies of coffee beans from said funnel and cyclically to register with the opening in said wall and therefore with said inlet in turn to enable a cyclic feed of successive secondary supplies of coffee beans to said agitator from said primary supply, heat generating means in said furnace comprising two parts, a current supply, thermostatic control means in said furnace, an electric motor operatively associated with said agitator for operating said agitator, a trap door in said funnel and actuated when beans from the primary supply pass through the funnel, an electric switch operatively associated with said current supply, said trap door and said heat generating means to cut in the current for one part of said heat generating means when beans from the primary supply pass through said funnel and actuate said trap door, said thermostatic control means being operatively associated with said current supply and motor to cut in the current to said motor when a predetermined temperature has been attained in said furnace in turn to initiate the actuation of said agitator cyclically to feed successive secondary supplies of coffee beans to said agitator from said primary supply, and a weight connected to said trap door to return said trap door to initial position in turn to open said switch thereby to interrupt the current to said one part of said heat generating means without affecting the current to said motor when the primary supply of coffee beans clears said trap door.

5. The combination of a coffee roasting furnace, a rotatable agitator in said furnace, said agitator having a feed inlet and a discharge outlet, a funnel for receiving a primary supply of coffee beans, a wall having an opening smaller than said inlet and registering with a part of said inlet to one side of the axis of rotation of said agitator, a rotatable feeder mounted to rotate with said agitator and having a pocket one end of which corresponds in size to the opening in said wall registering with said opening to one side of the axis of rotation of said feeder, said pocket being positioned cyclically to receive secondary supplies of coffee beans from said funnel and cyclically to register with the opening in said wall and therefore with said inlet in turn to enable a cyclic feed of successive secondary supplies of coffee beans to said agitator from said primary supply, a current supply, three heat generating units in said furnace, a first thermostatic control in said furnace, an electric motor operatively associated with said agitator for operating said agitator, a trap door in said funnel actuated by the passing of coffee beans through said funnel, an electric switch mounted on said trap door and connected to said current supply and to two of said heat generating units to cut in the current for said two heat generating units when said beans from said primary supply are fed into said funnel and actuate said trap door, said first thermostatic control being operatively associated with said motor and current supply to cut in current for said motor when a predetermined temperature has been attained in turn to initiate the actuation of said agitator, a second thermostatic control in said furnace operatively connected to all three heat generating units and operative to interrupt the current to all three heat generating units when a predetermined maximum temperature is reached and again to cut in the current when a predetermined minimum temperature is reached, and means operatively associated with said trap door to return said trap door to initial position in turn to open said switch and thereby to interrupt the current to said two heat generating units without affecting the current to said motor when the primary supply of coffee beans clears said trap door.

6. The combination of a coffee roasting furnace, a rotatable agitator in said furnace, said agitator having a feed inlet and a discharge outlet, a funnel for receiving a primary supply of coffee beans, a wall having an opening smaller than said inlet and registering with a part of said inlet to one side of the axis of rotation of said agitator, a rotatable feeder mounted to rotate with said agitator and having a pocket one end of which corresponds in size to the opening in said wall registering with said opening to one side of the axis of rotation of said feeder, said pocket being positioned cyclically to receive secondary supplies of coffee beans from said funnel and cyclically to register with the opening in said wall and therefore with said inlet in turn to enable a cyclic feed of successive secondary supplies of coffee beans to said agitator from said primary supply, a current supply, heat generating means in said furnace, a thermostatic control in said furnace, an electric motor operatively associated with said agitator for operating said agitator, a trap door in said funnel and actuated when beans from the primary supply pass through the funnel, an electric switch mounted on said trap door and connected to said current supply and heat generating means to cut in the current for said heat generating means when beans from the primary supply are fed through said funnel and actuate said trap door, said thermostatic control being connected to said current supply and said motor to cut in current for said motor when a predetermined temperature has been attained in turn to initiate the actuation of said agitator cyclically to feed successive secondary supplies of coffee to said agitator from said primary supply, an exhaust fan, and a second motor operatively associated with said exhaust fan, said exhaust fan being positioned below said furnace to draw off any objectionable smoke and fumes.

7. The combination of a coffee roasting furnace, a rotatable agitator in said furnace, said agitator having a feed inlet and a discharge outlet, a funnel for receiving a primary supply of coffee beans, a wall having an opening smaller than said inlet and registering with a part of said inlet to one side of the axis of rotation of said agitator, a rotatable feeder mounted to rotate with said agitator and having a pocket one end of which corresponds in size to the opening in said wall registering with said opening to one side of the axis of rotation of said feeder, said pocket being positioned cyclically to receive secondary supplies of coffee beans from said funnel and cyclically to register with the opening in said wall and therefore with said inlet in turn to enable a cyclic feed of successive secondary supplies of coffee beans to said agitator from said primary supply, a current supply, heat generating means in said furnace, a thermostatic control in said furnace, an electric motor operatively associated with said agitator for operating said agitator, a trap door in said funnel and actuated when beans from the primary supply pass through the funnel, an electric switch mounted on said trap door, connected to said current supply and to said heat generating means to cut in the current for said heat generating means when a primary supply of coffee beans is fed into said funnel to actuate said trap door in turn to close said switch, said thermostatic control being connected to said current supply and said motor to cut in current for said motor when a predetermined temperature has been attained in turn to initiate the actuation of said agitator cyclically to feed successive secondary predetermined supplies of coffee to said agitator from said primary supply, and a fan operatively associated with said motor to cool said motor and in turn to supply a blast of air on the coffee beans discharging from said discharge outlet.

8. The combination of a coffee roasting furnace, a rotatable agitator in said furnace, said agitator having a feed inlet and a discharge outlet, a funnel for receiving a primary supply of coffee beans, a wall having an opening smaller than said inlet and registering with a part of said inlet to one side of the axis of rotation of said agitator, a rotatable feeder mounted to rotate with said agitator and having a pocket one end of which corresponds in size to the opening in said wall registering with said opening to one side of the axis of rotation of said feeder, said pocket being positioned cyclically to receive secondary supplies of coffee beans from said funnel and cyclically to register with the opening in said wall and therefore with said inlet in turn to enable a cyclic feed of successive secondary supplies of coffee beans to said agitator from said primary supply, a current supply, an electro-magnet, two heat generating means in said furnace, a first thermostatic control in said furnace, an electric motor operatively associated with said agitator for operating said agitator, a trap door in said funnel and actuated when beans from the primary supply pass through the funnel, an electric switch mounted on said trap door and connected to said current supply and one of said heat generating means to cut in the current to said latter heat generating means when said trap door is deflected by the passage of a primary supply of coffee beans through said funnel, said first thermostatic control being connected to said current supply and said motor to cut in the current for said motor when a predetermined temperature has been attained in said furnace in turn to initiate the actuation of said agitator, a second thermostatic control in said furnace connected to said electro-magnet to interrupt the current to said electro-magnet when a predetermined maximum temperature is reached and again to cut in the current when a predetermined minimum temperature is reached, and a second switch controlled by said electro-magnet and operatively associated with both of said heat generating means to interrupt the current to both of said heat generating means when the current to said electro-magnet is interrupted and in turn to cut in the current to both of said heat generating means when the current for said electro-magnet is re-established.

9. In a coffee roasting apparatus having a furnace, three heating units in said furnace, a coffee receiving drum rotatably mounted in said furnace, an electric motor drivingly connected to rotate said drum, a funnel for initially receiving a primary supply of coffee, and means for guiding successive portions of the supply of coffee from said funnel to said drum, the devices for controlling said heating units and said electric motor consisting in a main switch, electrical conductors connecting one of said heating units to said main switch and to a current supply to establish a current in said heating unit when said main switch is closed, an arm movably mounted in said funnel, a second switch mounted on said arm and responsive to the passage of coffee through said funnel actuating said arm to close said second switch, electric conductors for connecting said second switch and two remaining heating units to said first electrical conductors, a thermostatic unit in said furnace, electric conductors connecting said thermostatic unit to said motor and to the current supply, said second switch when closed by the actuation of said arm establishing a current in said two remaining heating units, and said thermostatic unit being responsive to the heat created in said furnace to establish a current in said motor.

10. In a coffee roasting apparatus having a furnace, three heating units in said furnace, a coffee receiving drum rotatably mounted in said furnace, an electric motor drivingly connected to rotate said drum, a funnel for initially receiving a primary supply of coffee, and means for guiding successive portions of the supply of coffee from said funnel to said drum, the devices for controlling said heating units and said electric motor consisting in a main switch, a second switch, electrical conductors connecting one of said heating units to said main switch and to said second switch and to a current supply to establish a current in said one heating unit when said two switches are closed, an arm operably mounted in said funnel, a third switch mounted on said arm and responsive to the passage of coffee through said funnel actuating said arm to close said third switch, electric conductors for connecting said third switch and two remaining heating units to said first electrical conductors, a thermostatic unit in said furnace, electric conductors connecting said thermostatic unit to said motor and to the current supply, said third switch when closed by the actuation of said arm establishing a current in said two remaining heating units, said thermostatic unit being responsive to the heat created in said furnace to establish a current in said motor, means for normally maintaining said second switch open, an electro-magnet when energized for closing said second switch, a second thermostatic unit in said furnace, electric conductors connecting said second thermostatic unit to said electro-magnet and to the current supply, said second thermostatic unit being responsive to a predetermined maximum temperature in said furnace to interrupt the current passing through said electro-magnet to enable said second switch to open and thereby interrupt the current in said three heating units, said second thermostatic unit being also responsive to a predetermined minimum temperature in said furnace again to establish a circuit through said electro-magnet in turn to close said second switch and thereby to re-establish the current in said three heating units.

11. The combination of a coffee roasting furnace, a rotatable agitator in said furnace, said agitator having a feed inlet and a discharge outlet, a funnel for receiving a predetermined supply of coffee beans, means for guiding the coffee beans from said funnel to said inlet, heat generating means in said furnace comprising two parts, a current supply, thermostatic control means in said furnace, an electric motor operatively associated with said agitator for operating said agitator, a trap door in said funnel and actuated when beans from the predetermined supply pass through the funnel, an electric switch operatively associated with said current supply, said trap door and said heat generating means to cut in the current for one part of said heat generating means when beans from the predetermined supply pass through said funnel and actuate said trap door, said thermostatic control means being operatively associated with said current supply and motor to cut in the current to said motor when a predetermined temperature has been attained in said furnace in turn to initiate the actuation of said agitator, and a weight connected to said trap door to return said trap door to initial position in turn to open said switch thereby to interrupt the current to said one part of said heat generating means without affecting the current to said motor when the predetermined supply of coffee beans clears said trap door.

12. The combination of a coffee roasting furnace, a rotatable agitator in said furnace, said agitator having a feed inlet and a discharge outlet, a funnel for receiving a predetermined supply of coffee beans, means for guiding the coffee beans from said funnel to said inlet, a current supply, three heat generating units in said furnace, a first thermostatic control in said furnace, an electric motor operatively associated with said agitator for operating said agitator, a trap door in said funnel actuated by the passing of coffee beans through said funnel, an electric switch mounted on said trap door and connected to said current supply and to two of said heat generating units to cut in the current for said two heat generating units when said beans from said predetermined supply are fed into said funnel and actuate said trap door, said first thermostatic control being operatively associated with said motor and current supply to cut in current for said motor when a predetermined temperature has been attained in turn to initiate the actuation of said agitator, a second thermostatic control in said furnace operatively connected to all three heat generating units and operative to interrupt the current to all three heat generating units when a predetermined maximum temperature is reached and again to cut in the current when a predetermined minimum temperature is reached, and means operatively associated with said trap door to return said trap door to initial position in turn to open said switch and thereby to interrupt the current to said two heat generating units without affecting the current to said motor when the predetermined supply of coffee beans clears said trap door.

13. The combination of a coffee roasting furnace, a rotatable agitator in said furnace, said agitator having a feed inlet and a discharge outlet, a funnel for receiving a predetermined supply of coffee beans, means for guiding the coffee beans from said funnel to said inlet, a current supply, an electro-magnet, two heat generating means in said furnace, a first thermostatic control in said furnace, an electric motor operatively associated with said agitator for operating said agitator, a trap door in said funnel and actuated when beans from the predetermined supply pass through the funnel, an electric switch mounted on said trap door and connected to said current supply and one of said heat generating means to cut in the current to said latter heat generating means when said trap door is deflected by the passage of said predetermined supply of coffee beans through said funnel, said first thermostatic control being connected to said current supply and said motor to cut in the current for said motor when a predetermined temperature has been attained in said furnace in turn to initiate the actuation of said agitator, a second thermostatic control in said furnace connected to said electro-magnet to interrupt the current to said electro-magnet when a predetermined maximum temperature is reached and again to cut in the current when a predetermined minimum temperature is reached, and a second switch controlled by said electro-magnet and operatively associated with both of said heat generating means to interrupt the current to both of said heat generating means when the current to said electro-magnet is interrupted and in turn to cut in the current to both of said heat generating means when the current for said electro-magnet is re-established.

RAPHAEL ATTI.